F. C. WARNE.
NUT LOCK.
APPLICATION FILED JAN. 25, 1917.

1,272,584.

Patented July 16, 1918.

Inventor
Frederick C. Warne
by
By
his Attorney.

UNITED STATES PATENT OFFICE.

FREDERICK C. WARNE, OF MANSFIELD, OHIO.

NUT-LOCK. REISSUED 1,272,584.      Specification of Letters Patent.      Patented July 16, 1918.

Application filed January 25, 1917. Serial No. 144,513.

*To all whom it may concern:*

Be it known that I, FREDERICK C. WARNE, a citizen of the United States of America, residing at Mansfield, in the county of Richland and State of Ohio, have invented certain new and useful Improvements in Nut-Locks, of which the following is a specification.

This invention relates to an improvement in nut locks of that type wherein the locking member is formed with a projection, adapted to be forced down into a groove or channel in the bolt, to lock the parts against relative rotation.

In nut locks of this type it is important that the locking member be so constructed and arranged as to afford the maximum strength when locked, without interfering with the capability of the structure for restoring the locking element to normal position for free release of the parts.

Furthermore, particularly in automobile construction, where the applied nuts are sometimes difficult to reach, it is of importance that the nut and locking means be so constructed as to avoid any interference with the use of the usual wrench, ordinarily of the socket type, in applying and removing the nut.

The main object of the present invention, therefore, is a provision of a locking means separate from the nut, and which has a threaded connection with the bolt, and embodies a series of more or less flexible projections or fingers, any one of which, when in register with a groove or channel in the bolt, may be turned down into such channel to secure the applied parts against independent rotative movement on the bolt.

The fingers are of such length that when seated in the channel they will be disposed at an inclination to the longitudinal plane of the bolt other than a right angle, whereby to permit the application of a convenient implement into the groove and beneath the bent finger, to return said finger to normal position beyond the threads of the bolt, to free the locked parts for the unscrewing operation.

The invention is illustrated in the accompanying drawings in which:—

Figure 1:
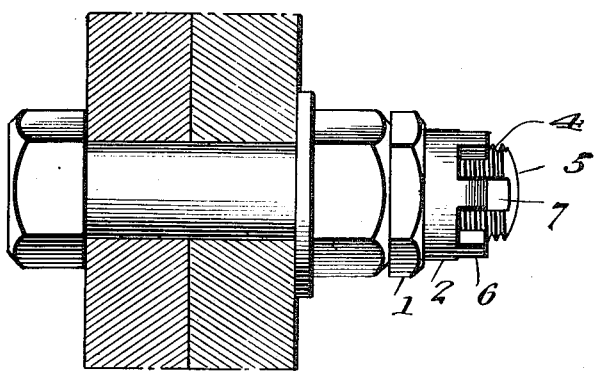
Figure 1 is a view in elevation partly in section, illustrating the improved nut lock, the locking member being shown as integral with the nut.
Figure 2:
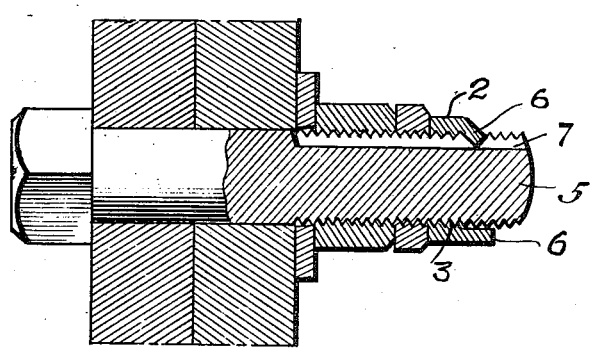
Fig. 2 is a vertical sectional view illustrating the improvement and showing the nut lock member as separate from the bolt.

The locking member is separate from the nut 1, and is formed to provide an annular section 2, having an external diameter approximately equal to the minimum transverse external dimension of the nut, to avoid projection beyond the side surface of the nut. The bore of the projection 2 is coextensive with the bore of the nut and the surface thus provided is threaded at 3 for coöperation with the threads 4 of the bolt 5. Projecting downwardly from the free forward edge surface of the portion 2 are a series of fingers 6. These fingers may be in any number, though it is preferred that they be in sufficient number to permit the coöperation of the particular one with a channel 7 formed longitudinally of the bolt, in practically any position of the nut. It has been found that six or eight such fingers will be sufficient number to permit a proper seating of the nut, and operation of the lock, with one or the other of said fingers in proper position for locking coöperation with the channel.

An essential feature of the invention resides in so constructing the fingers to form free relatively inner surfaces, that is those surfaces which form a practical continuation of the bore of the nut, are arranged beyond the threaded grooves in said bore, so that when the nut lock is applied the inner surfaces of the fingers will lie wholly beyond and entirely free from the threads of the bolt.

Figure 3:
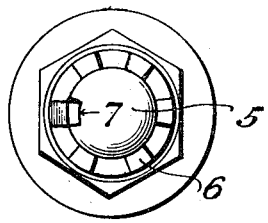
Fig. 3 is a front elevation of the form shown in Fig. 2.
Figure 4:
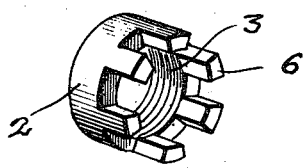
Fig. 4 is a perspective view of the locking member as an independent element.

The improved nut lock is constructed with a view to providing maximum strength and at the same time permitting the continued reuse of the locking element. It is to be noted that the locking element has threaded connection with the bolt and that the fingers of the locking element are of such length that when turned down into the groove or channel in bolt such fingers will lie at a forward downward inclination with respect to the bolt, whereby they may be readily restored to normal position by an inserted tool, when desired to release the locking coöperation. Of course it is preferred that in sectional contour and size, the fingers correspond more or less accurately with the similar dimension and shape of the channel 7, and both have their side walls preferably on lines corresponding to radial lines of the bolt, so that as the finger is driven in to the channel there will result a comparative wedging action, as shown more particularly in Fig. 3, to more effectively hold the finger in place.

Attention is called to the fact that when the finger is forced out of engagement with the channel by a suitable tool being wedged underneath the end of the finger, the line of least resistance of the finger will be at the point of the projection of the finger from the part 2, therefore the finger will be clearly withdrawn from engagement with the channel or groove without destroying, multilating or in any way injuring the threads of the bolt, locking member or nut.

What is claimed as new is,—

A nut having a threaded bore, a bolt, a separate cylindrical member of less external diameter than the size of the nut and engaging one face of the nut the cylindrical member having a threaded bore alining with and forming a continuation of the bore of the nut and a series of circularly arranged fingers projecting from the free edge of such cylindrical member and having their outer and inner surfaces respectively coincident with the outer surface of the cylindrical member and with the inner surface of said member and of the nut immediately beyond the threads.

In testimony whereof I affix my signature.

FREDERICK C. WARNE.